US009131249B2

(12) United States Patent
Date et al.

(10) Patent No.: US 9,131,249 B2
(45) Date of Patent: Sep. 8, 2015

(54) APPARATUS FOR ENCODING MOVING IMAGES TO MINIMIZE AN AMOUNT OF GENERATED CODE

(75) Inventors: Naoto Date, Kanagawa (JP); Shinichiro Koto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1069 days.

(21) Appl. No.: 13/047,981

(22) Filed: Mar. 15, 2011

(65) Prior Publication Data

US 2011/0164678 A1    Jul. 7, 2011

Related U.S. Application Data

(63) Continuation of application No. PCT/JP2009/060382, filed on Jun. 5, 2009.

(30) Foreign Application Priority Data

Oct. 10, 2008  (JP) ................................ 2008-264501
Feb. 26, 2009  (JP) ................................ 2009-044518

(51) Int. Cl.
*H04N 19/91* (2014.01)
*H04N 19/13* (2014.01)
*H04N 19/48* (2014.01)
(Continued)

(52) U.S. Cl.
CPC ............ *H04N 19/91* (2014.11); *H04N 19/103* (2014.11); *H04N 19/115* (2014.11); *H04N 19/126* (2014.11); *H04N 19/13* (2014.11); *H04N 19/146* (2014.11); *H04N 19/176* (2014.11);
(Continued)

(58) Field of Classification Search
None
See application file for complete search history.

(56) References Cited

U.S. PATENT DOCUMENTS 5,793,897 A * 8/1998 Jo et al. ..................... 382/246
2002/0102027 A1 8/2002 Miyake et al.
(Continued)

FOREIGN PATENT DOCUMENTS

JP  6-152984  5/1994
JP  6-153172  5/1994
(Continued)

OTHER PUBLICATIONS

Japanese Office Action issued Oct. 22, 2013, in Japan Patent Application 2010-532837 (with English translation).
(Continued)

*Primary Examiner* — David N Werner
(74) *Attorney, Agent, or Firm* — Oblon, McClelland, Maier & Neustadt, L.L.P.

(57) ABSTRACT

According to one embodiment, a moving image encoding apparatus includes a calculation unit, a selection unit, and a compression unit. The calculation unit calculates, for each unit of processing, amounts of code using plural variable length compression modes, the variable length compression modes having compression rates different from each other. The selection unit selects a compression mode in which an accumulated amount of code is smaller than or equal to a predetermined amount of code, the compression mode being selected from the variable length compression modes and a fixed length compression mode on the basis of the amounts of code calculated for the variable length compression modes and an amount of code obtained when the image data is compressed by the fixed length compression mode. The compression unit compresses the unit of processing of image data by the compression mode selected and generates compressed data.

8 Claims, 11 Drawing Sheets

(51) Int. Cl.
  *H04N 19/126*  (2014.01)
  *H04N 19/176*  (2014.01)
  *H04N 19/115*  (2014.01)
  *H04N 19/61*   (2014.01)
  *H04N 19/103*  (2014.01)
  *H04N 19/146*  (2014.01)
  *H04N 19/69*   (2014.01)
  *H04N 19/124*  (2014.01)

(52) U.S. Cl.
  CPC .............. *H04N 19/48* (2014.11); *H04N 19/61* (2014.11); *H04N 19/124* (2014.11); *H04N 19/69* (2014.11)

(56) References Cited

U.S. PATENT DOCUMENTS

| | | | |
|---|---|---|---|
| 2003/0146855 A1* | 8/2003 | Sullivan et al. | 341/1 |
| 2003/0202710 A1* | 10/2003 | Cheung et al. | 382/246 |
| 2004/0071450 A1* | 4/2004 | Chujoh et al. | 386/111 |
| 2004/0114683 A1* | 6/2004 | Schwarz et al. | 375/240.2 |
| 2005/0038837 A1* | 2/2005 | Marpe et al. | 708/200 |
| 2005/0147172 A1* | 7/2005 | Winger et al. | 375/240.23 |
| 2005/0147173 A1* | 7/2005 | Winger et al. | 375/240.23 |
| 2006/0050789 A1* | 3/2006 | Gisquet et al. | 375/240.23 |
| 2006/0273939 A1* | 12/2006 | Tanaka et al. | 341/67 |
| 2007/0171985 A1* | 7/2007 | Kim et al. | 375/240.26 |
| 2007/0242894 A1* | 10/2007 | Kautzer et al. | 382/243 |
| 2008/0118167 A1* | 5/2008 | Boon | 382/246 |
| 2008/0212683 A1* | 9/2008 | Nakata et al. | 375/240.23 |
| 2009/0219177 A1* | 9/2009 | Le Lann et al. | 341/51 |
| 2009/0267812 A1* | 10/2009 | Chen et al. | 341/67 |
| 2010/0225508 A1* | 9/2010 | Kumura | 341/67 |
| 2011/0142419 A1* | 6/2011 | Zou et al. | 386/260 |

FOREIGN PATENT DOCUMENTS

| | | |
|---|---|---|
| JP | 2001-224027 | 8/2001 |
| JP | 2004-135251 A | 4/2004 |
| JP | 2008-42943 | 2/2008 |

OTHER PUBLICATIONS

Office Action issued Jun. 25, 2013 in Japanese Patent Application No. 2010-532837 (with English language translation).

Japanese International Search Report mailed Sep. 8, 2009 in PCT/JP2009/060382 filed Jun. 5, 2009.

Japanese Written Opinion mailed Sep. 8, 2009 in PCT/JP2009/060382 filed Jun. 5, 2009.

* cited by examiner

CONSTANT AMOUNT OF CODE
VARIABLE IMAGE QUALITY

LOCAL DEGRADATION OF IMAGE QUALITY

VARIABLE AMOUNT OF CODE
CONSTANT IMAGE QUALITY

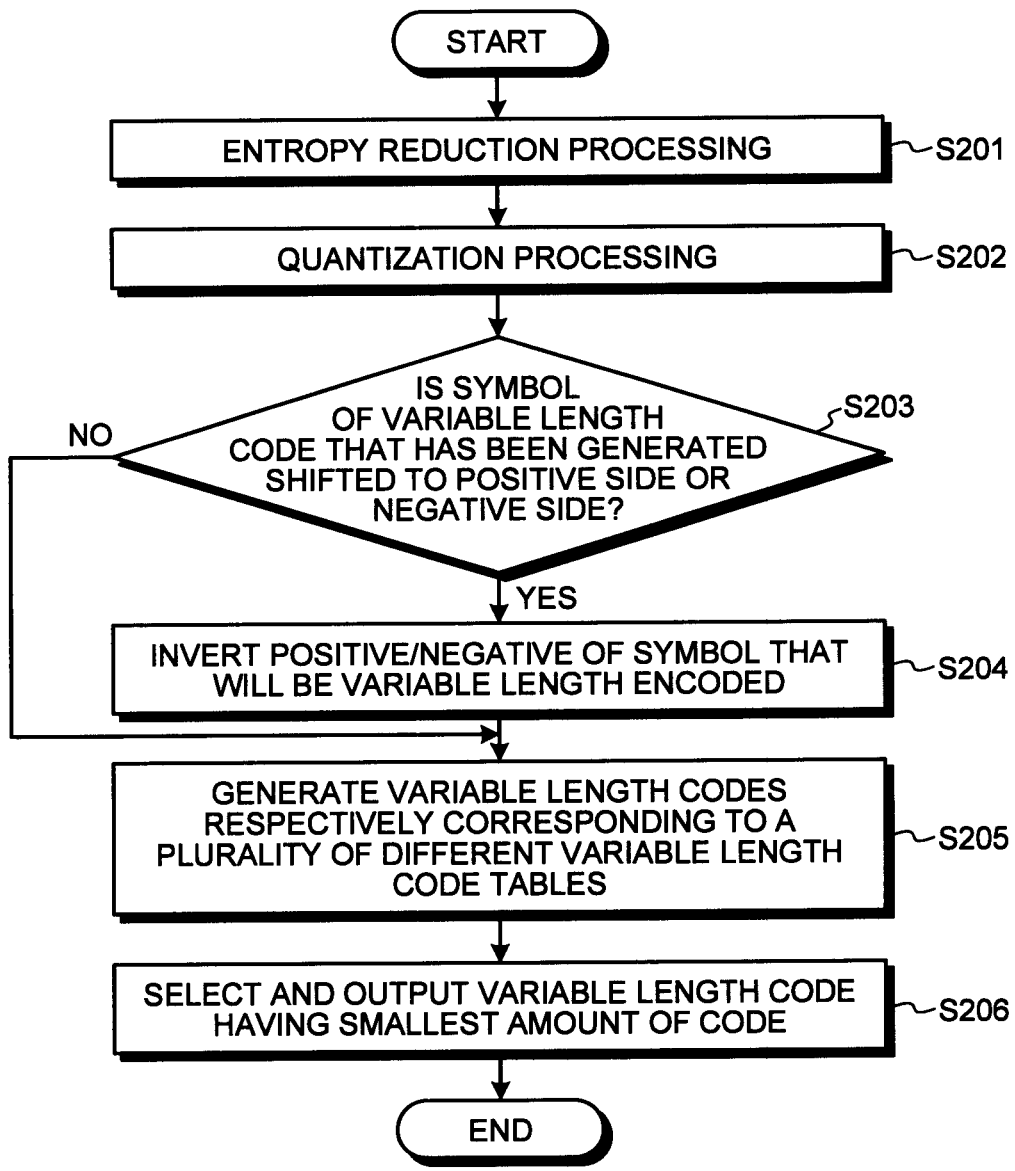

APPARATUS FOR ENCODING MOVING IMAGES TO MINIMIZE AN AMOUNT OF GENERATED CODE

CROSS-REFERENCE TO RELATED APPLICATIONS

This application is a continuation of International Application No. PCT/JP2009/060382, filed on Jun. 5, 2009 which claims the benefit of priority from Japanese Patent Application No. 2008-264501, filed on Oct. 10, 2008 and Japanese Patent Application No. 2009-044518, filed on Feb. 26, 2009, the entire contents of all of which are incorporated herein by reference.

FIELD

Embodiments described herein relate generally to moving image encoding.

BACKGROUND

Conventionally, in a technical field of moving image compression, there are often a band limitation in a transmission path through which compressed data passes and a size limitation in a compressed data storage area. Thus, a bit-rate control for compressing a moving image into compressed data smaller than a predetermined data size is important. In one example of such bit-rate control, the amount of generated data, i.e., the amount of code, is adjusted by controlling a quantization width for each unit of processing when performing compression processing. A parameter that indicates a quantization width is called Quantization Parameter (hereinafter referred to as "QP").

Constant Bit Rate (CBR) control is a typical bit-rate control, in which the amount of generated code is nearly a constant for each unit of processing. Incidentally, an image includes an area of complicated picture and an area of simple picture, and the former has a high compression difficulty and the latter has a low compression difficulty. In the CBR control, the same amount of code is allocated to the area of complicated picture and the area of simple picture. Therefore, a sufficient amount of code is allocated for the area of simple picture; however, the amount of code is not sufficient for the area of complicated picture. Due to this, in the area of complicated picture in an image, degradation of video quality occurs locally.

There is a method in which QP is selected such that an average value of the amount of code generated for each unit of processing does not exceeds a target amount of code per unit of processing when compressing each unit of processing. Also, there is a feedback method in which the amount of code allocated to the unit of processing to be processed next is determined from a difference between the amount of generated code and the target amount of code per unit of processing when compressing each unit of processing.

For example, JP-A 2008-42943 discloses an image compression encoding apparatus which selects either a compression method using a selected QP or a compression method with a lower compression rate for each encoding unit, taking into account the amounts of code generated by quantizing data using a plurality of different QPs and the amount of code generated by the compression method with a lower compression rate.

BRIEF DESCRIPTION OF THE DRAWINGS

FIG. 16 is a flowchart showing details of processing by the variable length compression unit.

DETAILED DESCRIPTION

Figure 1:
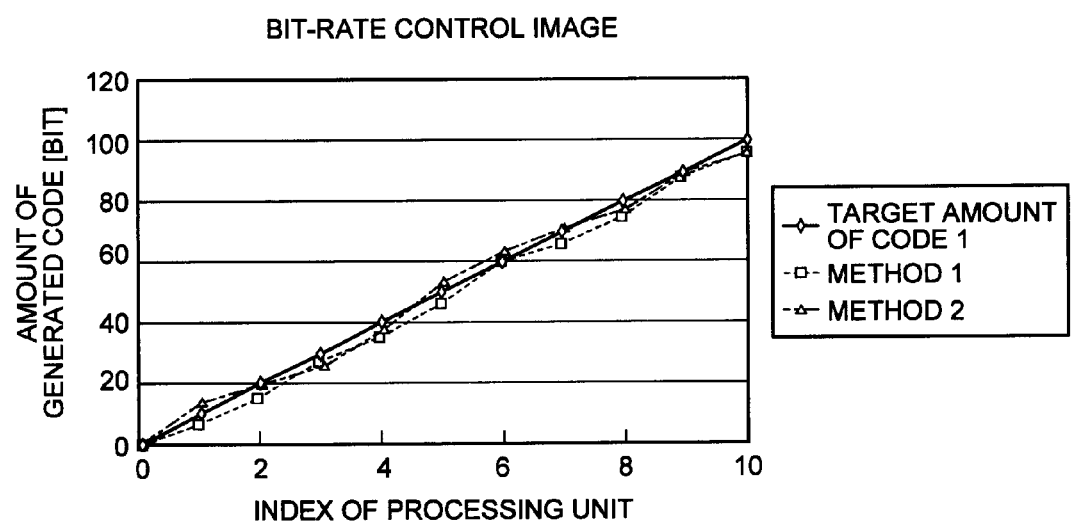
FIG. 1 is a diagram explaining a CBR control.

In general, according to one embodiment, a moving image encoding apparatus includes a calculation unit, a selection unit, and a compression unit. The calculation unit calculates, for each unit of processing, amounts of code using plural variable length compression modes, the unit of processing being obtained by dividing a predetermined unit of image data, the variable length compression modes having compression rates different from each other. The selection unit selects a compression mode in which an accumulated amount of code is smaller than or equal to a predetermined amount of code, the compression mode being selected from the variable length compression modes and a fixed length compression mode on the basis of the amounts of code calculated for the variable length compression modes and an amount of code obtained when the image data is compressed by the fixed length compression mode. The compression unit compresses the unit of processing of image data by the compression mode selected and generates compressed data.

In the image compression encoding apparatus disclosed in JP-A 2008-42943, it is not considered whether or not the amount of code generated by compressing a picture is always smaller than a predetermined value.

An ideal control of the amount of code is a control which can maintain video quality in an image at a constant level by changing the amount of code generated for each unit of processing and can compress the image into data having a size smaller than a predetermined data size by approximating QP to a constant value in the image.

Hereinafter, embodiments will be described with reference to the drawings.

A bit-rate control of moving image compression is indispensable in all fields of broadcasting, communication, and data storage. In broadcasting, for example, a bit rate limitation of video data (MPEG-2) occurs due to a limitation of radio wave band in terrestrial digital broadcasting. In communication, for example, when realizing a cableless wall hanging television that transmits and receives video data via wireless communication, the video data needs to be compressed to satisfy a data transfer rate of the wireless communication. In data storage, for example, in a digital versatile disk (DVD), a moving image needs to be compressed to satisfy a limitation of disk read speed and a limitation of disk capacity.

In another example, in a system which processes a large amount of video data, such as a codec LSI, the amount of memory and the bus width can be reduced by providing a compression device at an input/output portion of the memory in which the video data is stored. As described above, the bit-rate control which compresses a moving image to less than a predetermined size is very important.

In moving image compression, first, entropy reduction processing is performed for each unit of processing, and then signals are quantized, so that the amount of data is reduced. The unit of processing is, for example, a pixel, a pixel block, a macro block in MPEG (hereinafter referred to as "MB"), and the like. The entropy reduction processing is, for example, a difference calculation between image signals and an orthogonal transform of an image such as DCT.

FIG. 1 is a diagram explaining a CBR control. The horizontal axis in FIG. 1 is an index of the unit of processing, and for example, it is an identification number for each MB. The vertical axis in FIG. 1 indicates an accumulated value of the amount of code generated for each unit of processing.

Method 1 in FIG. 1 is a method in which QP is selected such that the accumulated value of the amount of generated code does not exceeds a target amount of code when compressing each unit of processing. Method 2 in FIG. 1 is a feedback method in which the amount of code allocated to the unit of processing to be processed next is determined from a difference between the amount of generated code and a target amount of code 1 when compressing each unit of processing.

Incidentally, a method in which the amount of generated code is nearly a constant for each unit of processing has a problem of image quality. FIG. 2 is a diagram explaining a compression difficulty and an allocation of the amount of code in an image. In an example of FIG. 2, an encoding target image p1 has an area where the compression difficulty is high in the vicinity of the center in the horizontal direction.

Figure 2A:
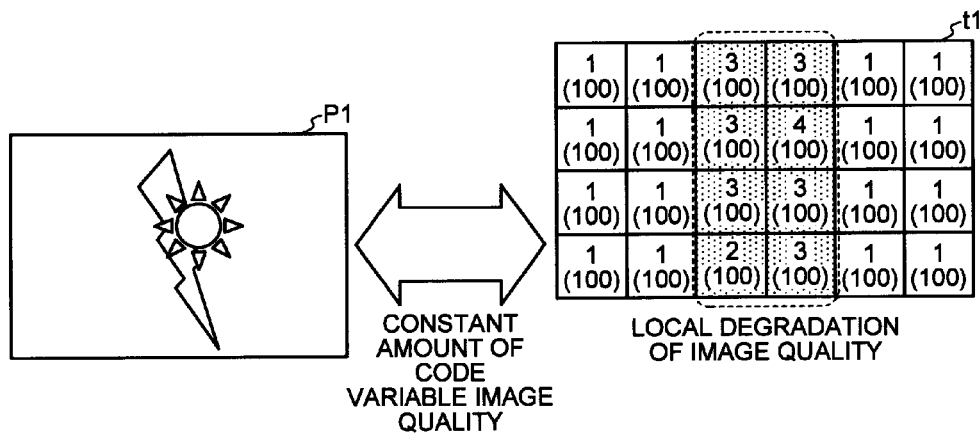
FIGS. 2A and 2B are diagrams showing a relationship between a compression difficulty and an allocation of the amount of code in an image.

FIG. 2A is an example in which control is performed so as to cause the amount of code to be constant for each unit of processing. A table t1 in FIG. 2A shows image quality and the amount of generated bits for each unit of processing. In the table t1, a number provided in a unit of processing indicates image quality, and a number shown in parentheses indicates the amount of generated bits. It is shown that the larger the number indicating image quality is, the worse the image quality is. In the table t1, the hatched portion represents a portion in which the numbers are large. In the table t1, the numbers indicating image quality are large in the vicinity of the center in the horizontal direction. The amount of generated bits is 100 for all units of processing.

Figure 2B:
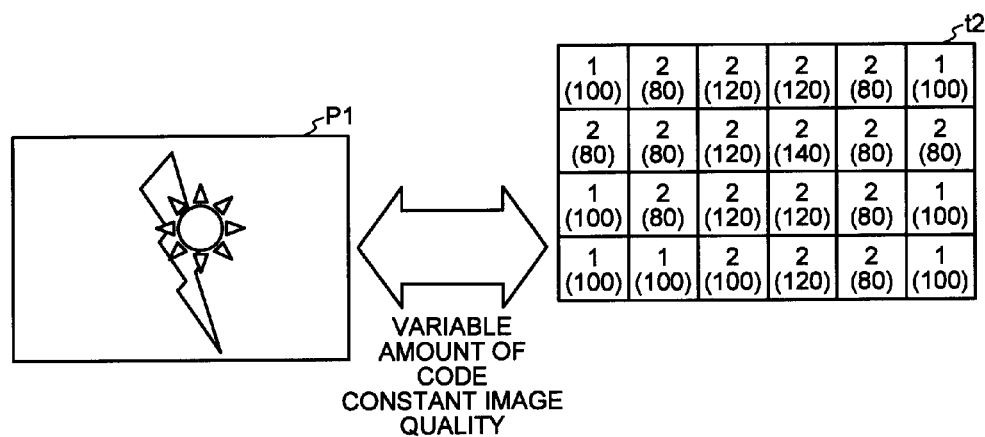

FIG. 2B is an example in which control is performed so as to cause image quality to be constant for each unit of processing. In the table t2 in FIG. 2B, the amount of generated bits for each unit of processing is 80 to 140, and the number indicating image quality is 1 or 2. FIG. 2B maintains more constant image quality compared with FIG. 2A, and has the total amount of code smaller than that of FIG. 2A.

First Embodiment

Figure 3:
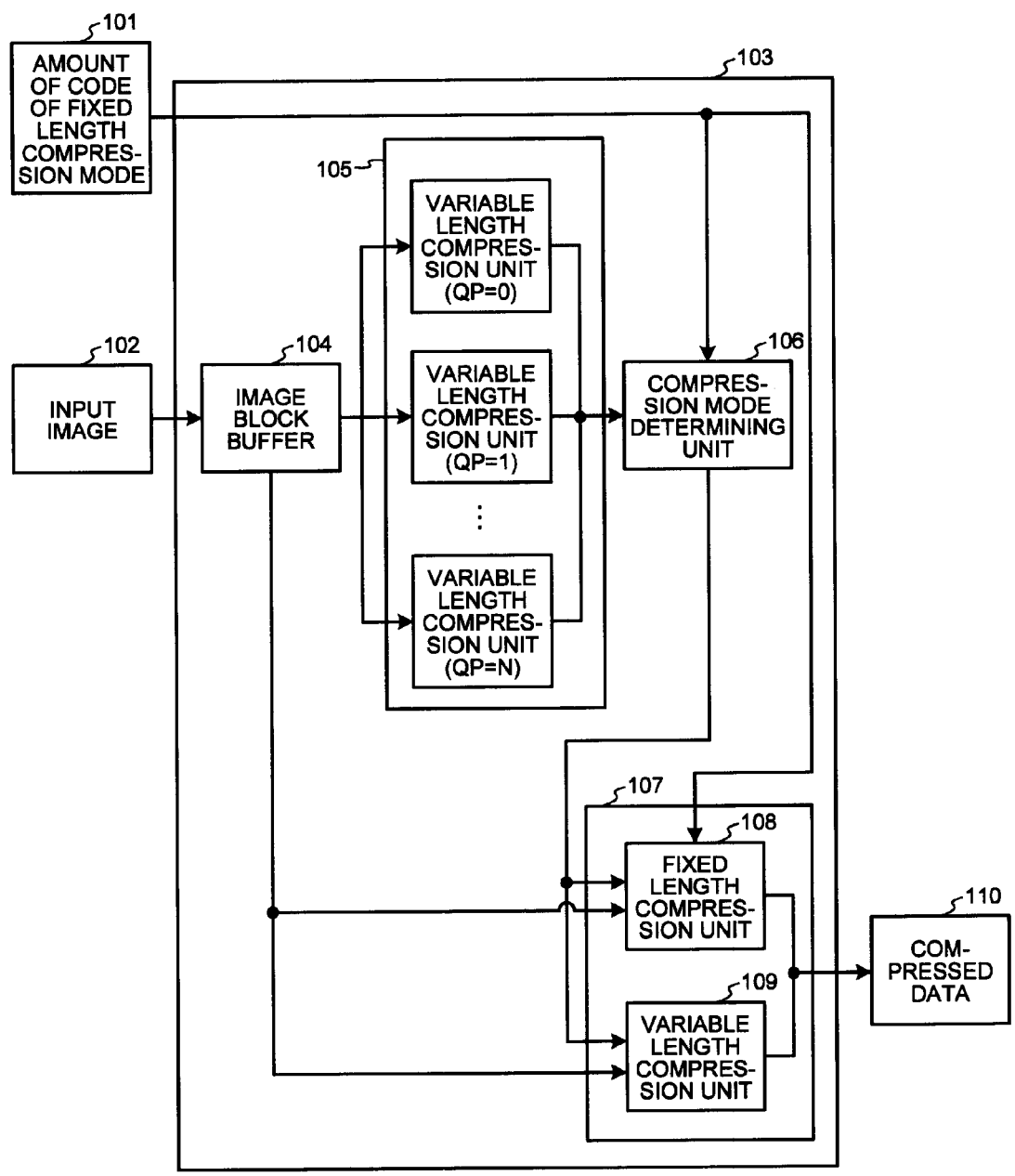
FIG. 3 is a block diagram showing a moving image encoding apparatus.

FIG. 3 is a diagram explaining a functional configuration of a moving image encoding apparatus 103 according to a first embodiment. An input image 102 is input to the moving image encoding apparatus 103. The moving image encoding apparatus 103 performs compression processing after determining compression mode on the basis of the amount of code of the fixed length compression mode 101, and outputs compressed data 110. The moving image encoding apparatus 103 includes an image block buffer 104, a temporary compression unit 105, a compression mode determining unit 106, and a primary compression unit 107.

The input image 102 is divided into blocks and stored in the image block buffer 104. The input image 102 is a unit for which a predetermined compression rate is guaranteed. The input image 102 may be image frames, pixel lines, image blocks, and the like. In this embodiment, a target amount of code after encoding is set for the input image 102. The blocks are obtained by dividing the image by an arbitrary method. A minimum unit of the block is a pixel, and a largest unit of the block is the entire image. For example, the block may be any one of a frame, a slice, an MB, a block, and an image sequence in MPEG. The blocks of the image stored in the image block buffer 104 is temporarily compressed by the temporary compression unit 105 using a plurality of different QPs, so that plural amounts of code corresponding to the QPs are obtained.

Figure 4:
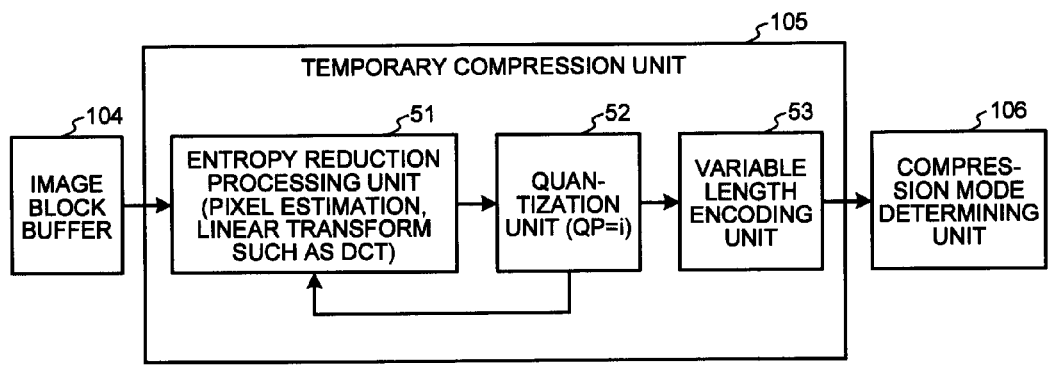
FIG. 4 is a block diagram showing a temporary compression unit.

FIG. 4 is a diagram explaining a functional configuration of the temporary compression unit 105. The temporary compression unit 105 includes an entropy reduction processing unit 51, a quantization unit 52, and a variable length encoding unit 53. The entropy reduction processing unit 51 performs differential processing with an estimated pixel value or a linear transform such as Discrete Cosine Transform (DCT) on the blocks stored in the image block buffer 104. The entropy reduction processing unit 51 generates an estimated error value by the differential processing with the estimated pixel value. The quantization unit 52 quantizes a block output from the entropy reduction processing unit 51 or blocks stored in the image block buffer. The variable length encoding unit 53 variable length encodes a quantized block. The amount of code to be generated is obtained by the above processing and transmitted to the compression mode determining unit 106.

The compression mode determining unit 106 determines a compression mode with which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and is a value smaller than or equal to the average amount of code allocated to a block.

The compression mode determining unit 106 selects a compression mode for each unit of processing so that the amount of code does not exceed the upper limit line of the amount of code. The compression mode determining unit 106 selects a compression mode from variable length compression modes, for which the amounts of code generated by the temporary compression unit 105 being evaluated, and the fixed length compression mode. The compression mode selected by the compression mode determining unit 106 is, for example, a mode in which the quantization step size is minimum, a mode in which the encoding distortion is minimum, a mode in which Rate-Distortion cost (the amount of encoding distortion+the amount of code×lambda; here, lambda is a coefficient) is minimum, or the like. The Rate-Distortion cost RD is represented by the following formula (1).

$$(RD) = (\text{the amount of encoding distortion}) + (\text{the amount of code}) \times (\text{lambda}) \quad (1)$$

Here, lambda is a coefficient.

Figure 5:
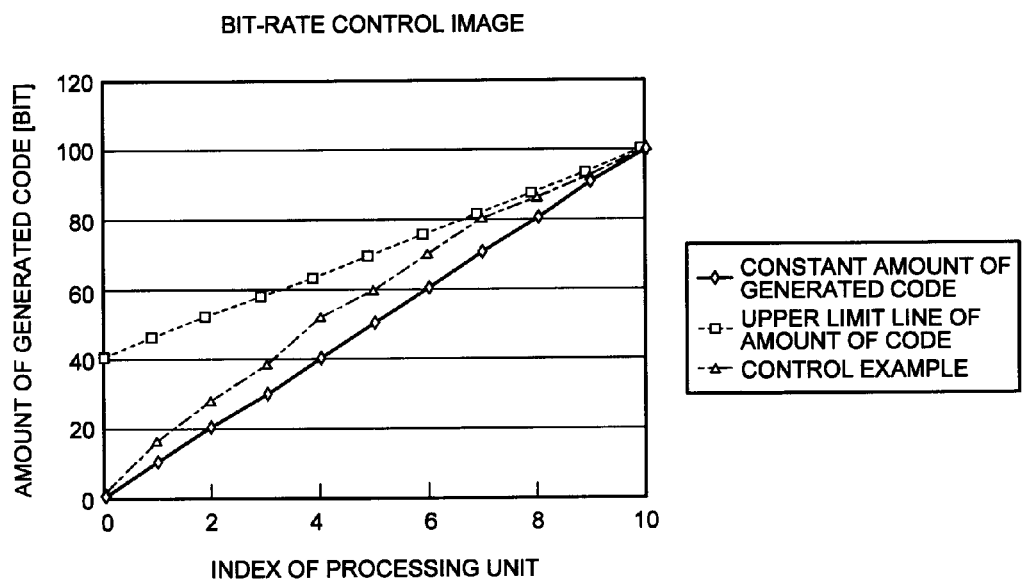
FIG. 5 is an explanation of an upper limit line of the amount of code.

FIG. 5 is a diagram explaining the upper limit line of the amount of code when the compression mode determining unit 106 determines a compression mode. FIG. 5 is a graph in which the horizontal axis is a unit of processing and the vertical axis is an accumulated value of the amount of generated code. In FIG. 5, the upper limit line of the amount of code is a linear function whose gradient is the fixed length compression mode code amount and intercept is a value obtained by subtracting the fixed length compression mode code amount×the number of units of processing in an image from the target amount of code. It is guaranteed that the compressed data is smaller than or equal to a predetermined data size when the amount of generated code does not exceeds the upper limit line of the amount of code. In other words, if all the blocks are compressed by the fixed length compression mode, the generated compressed data is smaller than or equal to a predetermined data size.

The upper limit line of the amount of code in FIG. 5 is an example, and the upper limit line of the amount of code may be an approximate value of the linear function in which the number of significant digits is reduced. In FIG. 5, the amount of generated code constant line is a linear function whose gradient is a value obtained by dividing the target amount of code by the number of units of processing. The amount of generated code constant line may be used as a lower limit when the amount of code for each unit of processing is set.

The primary compression unit 107 includes a fixed length compression unit 108 and a variable length compression unit 109. The primary compression unit 107 compresses the input image 102 to less than or equal to a predetermined size, and outputs compressed data 110. The amount of code of the fixed length compression mode 101 is set in the fixed length compression unit 108. The primary compression unit 107 performs compression by using either the fixed length compression unit 108 or the variable length compression unit 109 in accordance with the selection result of the compression mode determining unit 106, and generates the compressed data 110.

Figure 6:
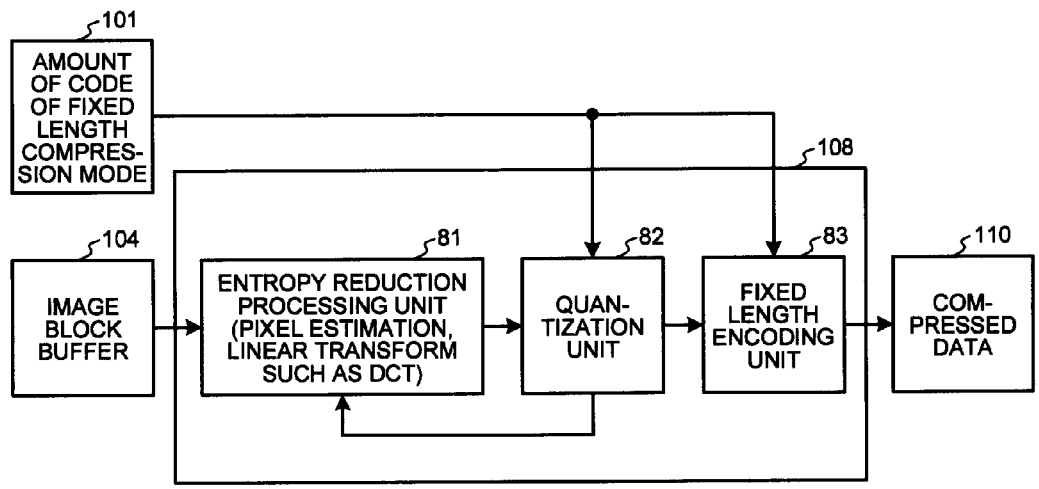
FIG. 6 is a block diagram showing an example of a fixed length compression unit.

FIG. 6 is a diagram explaining an example of a configuration of the fixed length compression unit 108. The fixed length compression unit 108 includes an entropy reduction processing unit 81, a quantization unit 82, and a fixed length encoding unit 83. The entropy reduction processing unit 81 performs entropy reduction processing on an image block, the quantization unit 82 quantizes the image block, and then, a fixed length code generator 303 performs fixed length encoding on the image block. The quantization unit 82 may directly quantize the image block. By these processing, the compressed data 110 whose amount of code is less than or equal to the amount of code of the fixed length compression mode 101 can be obtained.

Figure 7:
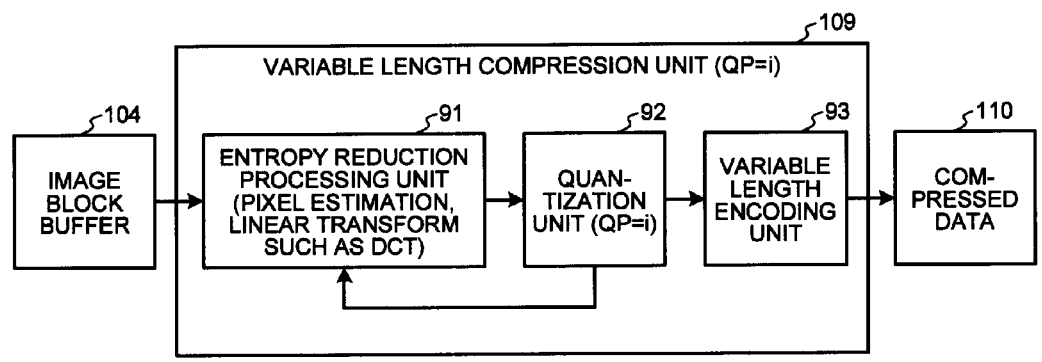
FIG. 7 is a block diagram showing an example of a variable length compression unit.

FIG. 7 is a diagram explaining an example of a configuration of the variable length compression unit 109. The variable length compression unit 109 includes an entropy reduction processing unit 91, a quantization unit 92, and a variable length encoding unit 93. The operations of the entropy reduction processing unit 91 and the quantization unit 92 are the same as those of the entropy reduction processing unit 91 and the quantization unit 92 included in the temporary compression unit 105. The variable length encoding unit 93 variable length encodes a quantized image block, and thereby outputs the compressed data 110.

With the above-described processing, the input image 102 can be compressed into the compressed data 110 having a predetermined data size. According to the first embodiment, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Second Embodiment

FIG. 3 is a diagram explaining a functional configuration of the moving image encoding apparatus 103 according to a second embodiment. The input image 102 is input to the moving image encoding apparatus 103. The moving image encoding apparatus 103 performs compression processing after determining compression mode on the basis of the amount of code of the fixed length compression mode 101, and outputs the compressed data 110. The moving image encoding apparatus 103 includes the image block buffer 104, the temporary compression unit 105, the compression mode determining unit 106, and the primary compression unit 107.

In this embodiment, similarly to the first embodiment, the input image 102 is divided into blocks and stored in the image block buffer 104. A target amount of code is set for the input image 102. The blocks of the image stored in the image block buffer 104 is temporarily compressed by the temporary compression unit 105 using a plurality of different QPs, so that plural amounts of code corresponding to the QPs are obtained.

FIG. 4 is a diagram explaining a functional configuration of the temporary compression unit 105. In this embodiment, the function and the configuration of the temporary compression unit 105 are the same as those in the first embodiment, so that the description thereof will be omitted.

The compression mode determining unit 106 determines a compression mode with which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and is a value smaller than or equal to the average amount of code allocated to a block. The compression mode determining unit 106 selects a compression mode by using, for example, the method described in the first embodiment.

The compression mode determining unit 106 selects a compression mode for each unit of processing so that the amount of code does not exceed the upper limit line of the amount of code. The compression mode determining unit 106 selects a compression mode from variable length compression modes, for which the amount of code generated by the temporary compression unit 105 being evaluated, and the fixed length compression mode.

Figure 8:
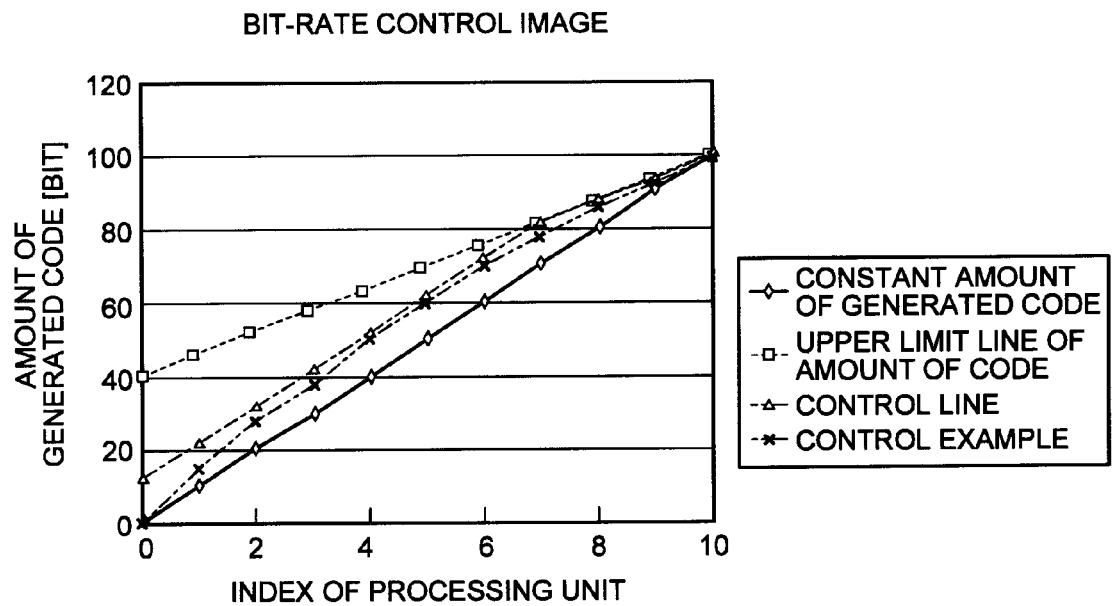
FIG. 8 is a diagram showing a relationship between the upper limit line of the amount of code and a control line.

FIG. 8 is a diagram explaining the upper limit line of the amount of code and a control line when the compression mode determining unit 106 determines a compression mode. FIG. 8 is a graph in which the horizontal axis is a unit of processing and the vertical axis is an accumulated value of the amount of generated code. In FIG. 8, the upper limit line of the amount of code is a linear function whose gradient is the fixed length compression mode code amount and intercept is a value obtained by subtracting the fixed length compression mode code amount×the number of units of processing in an image from the target amount of code. It is guaranteed that the compressed data is smaller than or equal to a predetermined data size when the amount of generated code does not exceeds the upper limit line of the amount of code. In other words, if all the blocks are compressed by the fixed length compression mode, the generated compressed data is smaller than or equal to a predetermined data size.

The control line is located in an area below the upper limit line of the amount of code and is present in order to prevent a large amount of code from being consumed at the initial stage of compression when compressing a predetermined unit of image data. More specifically, for each unit of processing, when the amount of generated code exceeds the control line, the compression mode is reset. At this time, the QP of the variable length compression is increased, or the fixed length compression mode is selected.

The upper limit line of the amount of code in FIG. 8 is an example, and the upper limit line of the amount of code may be an approximate value of the linear function in which the number of significant digits is reduced. In FIG. 8, the amount of generated code constant line is a linear function whose gradient is a value obtained by dividing the target amount of code by the number of units of processing. The amount of generated code constant line may be used as a lower limit when the amount of code for each unit of processing is set. The control line illustrated in FIG. 8 as an example is obtained by adding a constant offset to the amount of generated code constant line.

The primary compression unit 107 includes the fixed length compression unit 108 and the variable length compression unit 109. The primary compression unit 107 compresses the input image 102 to less than or equal to a predetermined size, and outputs the compressed data 110. The amount of code of the fixed length compression mode 101 is set in the fixed length compression unit 108. The primary compression unit 107 performs compression processing by using either the fixed length compression unit 108 or the variable length compression unit 109 in accordance with the selection result of the compression mode determining unit 106, and generates the compressed data 110. The functions and the configurations of the fixed length compression unit 108 and the variable length compression unit 109 are the same as those in the first embodiment.

With the above-described processing, the input image 102 can be compressed into the compressed data 110 having a predetermined data size. According to the second embodiment, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Third Embodiment

FIG. 3 is a diagram explaining a functional configuration of the moving image encoding apparatus 103 according to a third embodiment. The input image 102 is input to the moving image encoding apparatus 103. The moving image encoding apparatus 103 performs compression processing after determining compression mode on the basis of the amount of code of the fixed length compression mode 101, and outputs the compressed data 110. The moving image encoding apparatus 103 includes the image block buffer 104, the temporary compression unit 105, the compression mode determining unit 106, and the primary compression unit 107.

In this embodiment, similarly to the first embodiment, the input image 102 is divided into blocks and stored in the image block buffer 104. A target amount of code is set for the input image 102. The blocks of the image stored in the image block buffer 104 is temporarily compressed by the temporary compression unit 105 using a plurality of different QPs, so that plural amounts of code corresponding to the QPs are obtained.

In this embodiment, the configuration of the temporary compression unit 105 is approximately the same as that in the first embodiment; however, the function of the variable length encoding unit 53 is different from that in the first embodiment. Therefore, the variable length encoding unit 53 will be described here.

Figure 9:
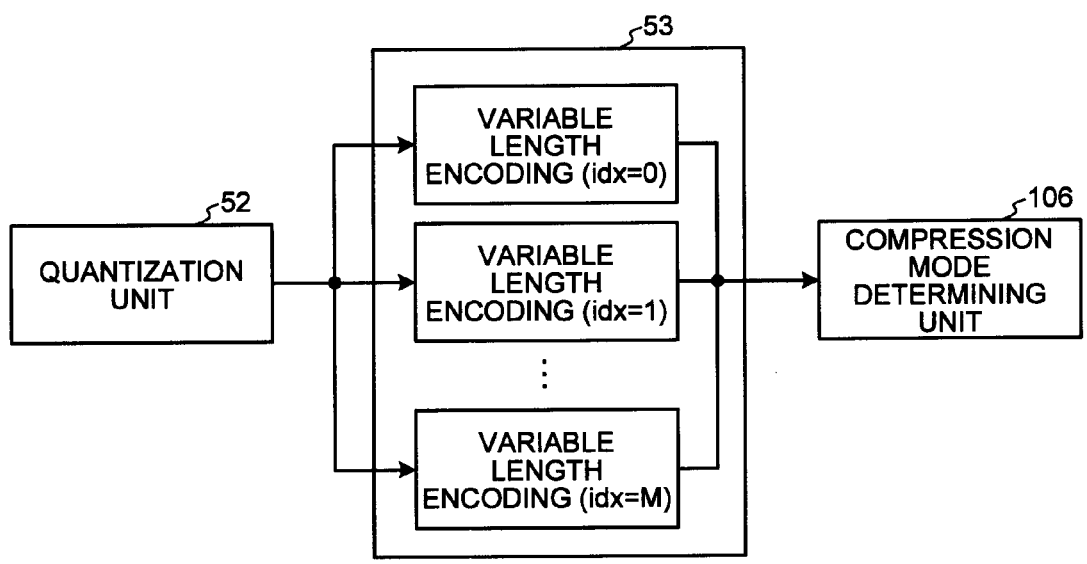
FIG. 9 is a block diagram showing an example of a variable length encoding unit.

FIG. 9 is a diagram explaining an example of a functional configuration of the variable length encoding unit 53. The variable length encoding unit 53 in FIG. 9 includes a plurality of variable length encoding units (idx=0, 1, . . . M) having different properties. More specifically, variable length code tables, each of which is used when each variable length encoding unit (idx) performs the variable length encoding processing, are different from each other. The variable length encoding unit 53 selects a variable length encoding unit (idx) having the smallest amount of code in accordance with an input signal string. In this way, it is possible to perform compression processing using an appropriate variable length code table on various input images.

In the example of FIG. 9, a plurality of variable length encoding units (idx) are provided. Alternatively, a single variable length encoding unit may be provided that performs switching to use a plurality of variable length code tables.

The amount of code to be generated is obtained by the above processing and transmitted to the compression mode determining unit 106.

The compression mode determining unit 106 determines a compression mode in which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and is a value smaller than or equal to the average amount of code allocated to a block. The compression mode determining unit 106 selects a compression mode by using, for example, the method described in the first embodiment.

The compression mode determining unit 106 selects a compression mode for each unit of processing so that the amount of code does not exceed the upper limit line of the amount of code. The compression mode determining unit 106 selects a compression mode from variable length compression modes, for which the amount of code generated by the temporary compression unit 105 being evaluated, and the fixed length compression mode.

The details of the processing of the compression mode determining unit 106 are the same as those in the first embodiment, so that the description thereof will be omitted. The functions and the configurations of the fixed length compression unit 108 and the variable length compression unit 109 included in the primary compression unit 107 are the same as those in the first embodiment.

With the above-described processing, the input image 102 can be compressed into the compressed data 110 having a predetermined data size. In this method, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Fourth Embodiment

FIG. 3 is a diagram explaining a functional configuration of the moving image encoding apparatus 103 according to a fourth embodiment. The input image 102 is input to the moving image encoding apparatus 103. The moving image encoding apparatus 103 performs compression processing after determining compression mode on the basis of the amount of code of the fixed length compression mode 101, and outputs the compressed data 110. The moving image encoding apparatus 103 includes the image block buffer 104, the temporary compression unit 105, the compression mode determining unit 106, and the primary compression unit 107.

In this embodiment, similarly to the first embodiment, the input image 102 is divided into blocks and stored in the image block buffer 104. A target amount of code is set for the input image 102. The blocks of the image stored in the image block buffer 104 is temporarily compressed by the temporary compression unit 105 using a plurality of different QPs, so that plural amounts of code corresponding to the QPs are obtained.

FIG. 4 is a diagram explaining a functional configuration of the temporary compression unit 105. In this embodiment, the function and the configuration of the temporary compression unit 105 are the same as those in the first embodiment, so that the description thereof will be omitted. The amount of code to be generated is obtained by the processing of the temporary compression unit 105 and transmitted to the compression mode determining unit 106.

The compression mode determining unit 106 determines a compression mode with which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and is a value smaller than or equal to the average amount of code allocated to a block.

The compression mode determining unit 106 selects a compression mode for each unit of processing so that the amount of code does not exceed the upper limit line of the amount of code. The compression mode determining unit 106 selects a compression mode from variable length compression modes, for which the amount of code generated by the temporary compression unit 105 being evaluated, and the fixed length compression mode. The compression mode determining unit 106 selects a compression mode by using, for example, the method described in the first embodiment.

The details of the processing of the compression mode determining unit 106 are the same as those in the first embodiment, so that the description thereof will be omitted.

Figure 10:
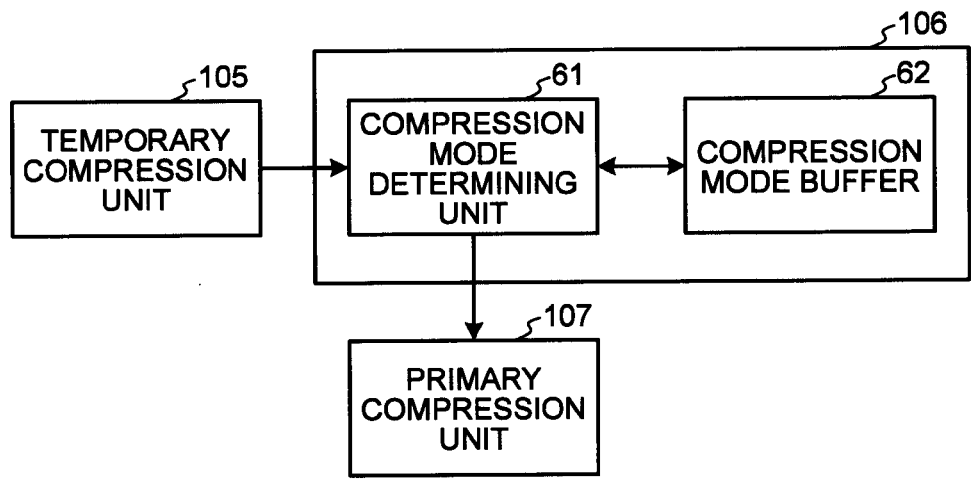
FIG. 10 is a block diagram showing an example of a compression mode determining unit.

FIG. 10 is a diagram explaining an example of a functional configuration of the compression mode determining unit 106. The compression mode determining unit 106 includes a compression mode determining unit 61 and a compression mode buffer 62. The compression mode buffer 62 holds a degree of compression difficulty, which is a value indicating how difficult the compression of the image that has been compressed was. The degree of compression difficulty is, for example, QP. In the fixed length compression mode, for example, the degree of compression difficulty may be a largest QP +1. The image that has been compressed is, for example, an image included in a block line including a block immediately above a block of interest.

Further, the compression mode determining unit 61 approximates the degree of compression difficulty of a block that has not yet been compressed by the degree of compression difficulty of a block that has already been compressed. When a block that is difficult to be compressed is detected from blocks that have not yet been compressed, the compression mode is changed so that the QP is increased, and thus the amount of code is reduced.

Figure 11:
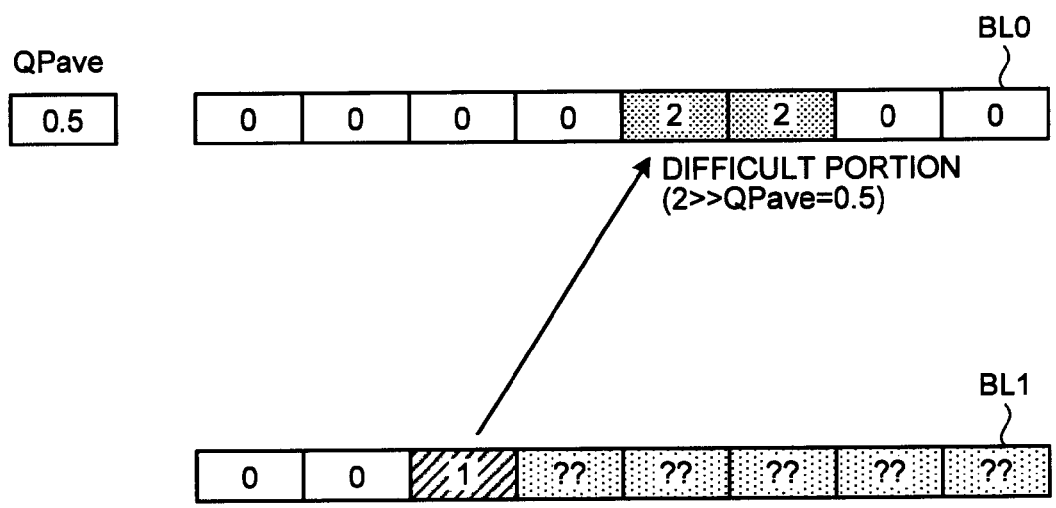
FIG. 11 is a diagram showing a change of compression mode based on the degree of compression difficulty of an image that has been compressed.

FIG. 11 is a diagram showing a change of compression mode based on the degree of compression difficulty of an image that has been compressed. In FIG. 11, BL0 indicates QP of each block in a block line immediately above the current line. In FIG. 11, BL1 indicates QP of each block in a block line including a block which is currently being compressed. The "QPave" is an average value of "compression mode values of each unit of processing in the previous image".

In FIG. 11, the average value of the degrees of compression difficulty QPave and the degree of compression difficulty QP of a block which is stored in the compression mode buffer and n blocks ahead of the current block are compared with each other, and when the degree of compression difficulty QP of the block that is n blocks ahead of the current block is greater than QPave by a predetermined number, the compression mode that is currently selected is changed to increase QP. In FIG. 11, in BL0, the degree of compression difficulty QP of the fifth block is greater than QPave by 1.5. Therefore, in BL1, QP of the third block is set to 1. This QP change processing is not necessarily has to be performed when the amount of code is sufficient. For example, when the accumulated amount of code of compressed data exceeds a line obtained by subtracting a constant offset from the amount of generated code constant line in FIG. 8, the QP change processing may be performed. The degree of compression difficulty corresponding to the compression mode determined by the compression mode determining unit 61 is stored in the compression mode buffer 62.

The primary compression unit 107 includes the fixed length compression unit 108 and the variable length compression unit 109. The primary compression unit 107 compresses the input image 102 to less than or equal to a predetermined size, and outputs the compressed data 110. The amount of code of the fixed length compression mode 101 is set in the fixed length compression unit 108. The primary compression unit 107 performs compression processing by using either the fixed length compression unit 108 or the variable length compression unit 109 in accordance with the selection result of the compression mode determining unit 106, and generates the compressed data 110. The functions and the configurations of the fixed length compression unit 108 and the variable length compression unit 109 are the same as those in the first embodiment.

With the above-described processing, the input image 102 can be compressed into the compressed data 110 having a predetermined data size. In this method, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Fifth Embodiment

FIG. 3 is a diagram explaining a functional configuration of the moving image encoding apparatus 103 according to a fifth embodiment. The input image 102 is input to the moving image encoding apparatus 103. The moving image encoding apparatus 103 performs compression processing after determining compression mode on the basis of the amount of code of the fixed length compression mode 101, and outputs the compressed data 110. The moving image encoding apparatus 103 includes the image block buffer 104, the temporary compression unit 105, the compression mode determining unit 106, and the primary compression unit 107.

In this embodiment, similarly to the first embodiment, the input image 102 is divided into blocks and stored in the image block buffer 104. A target amount of code is set for the input image 102. The blocks of the image stored in the image block buffer 104 are temporarily compressed by the temporary compression unit 105 using a plurality of different QPs, so that plural amounts of code corresponding to the QPs are obtained.

In this embodiment, the configuration of the temporary compression unit 105 is approximately the same as that in the first embodiment; however, the function of the variable length encoding unit 53 is different from that in the first embodiment. Therefore, the variable length encoding unit 53 will be described here.

Figure 12:
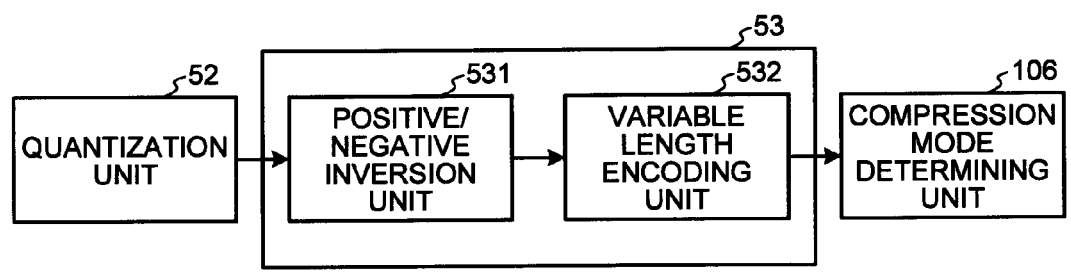
FIG. 12 is a block diagram showing an example of the variable length encoding unit

FIG. 12 is a diagram explaining an example of a configuration of the variable length encoding unit 53 which is different from that of the first embodiment. The variable length encoding unit 53 includes a positive/negative inversion unit 531 and a variable length encoding unit 532. The positive/negative inversion unit 531 observes the positive/negative of input signal strings that have been quantized, and when many signal strings input in a certain period of time are positive, it is considered that the signal input next is probably negative, so that the positive/negative inversion unit 531 inverts the positive/negative of the signal and transmits the signal to the variable length encoding unit 532. The symbol that is variable length compressed by the variable length encoding unit 532 may not only be a conversion coefficient after the quantization, but also be a pixel value.

Figure 13:
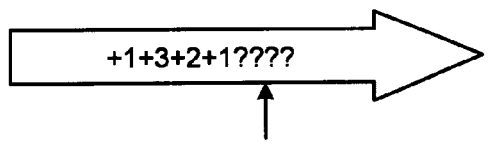
FIG. 13 is a diagram showing signal values that have been observed and signals that have not yet been observed.

FIG. 13 is a diagram explaining signals that have been observed and signals that have not been observed in input signal strings. In FIG. 13, values are aligned from left to right in the observed order, and values that have not been observed are represented by a symbol "?" (question mark). The values are estimated values, which are differences between a signal that has been observed and a signal immediately previous to the signal. In the example of FIG. 13, all the estimated values of the signals that have been observed are positive. Therefore, it is considered that estimated values of the signals that have not been observed are probably negative, so that the positive/negative of the signals that are newly observed are inverted.

Figure 14:
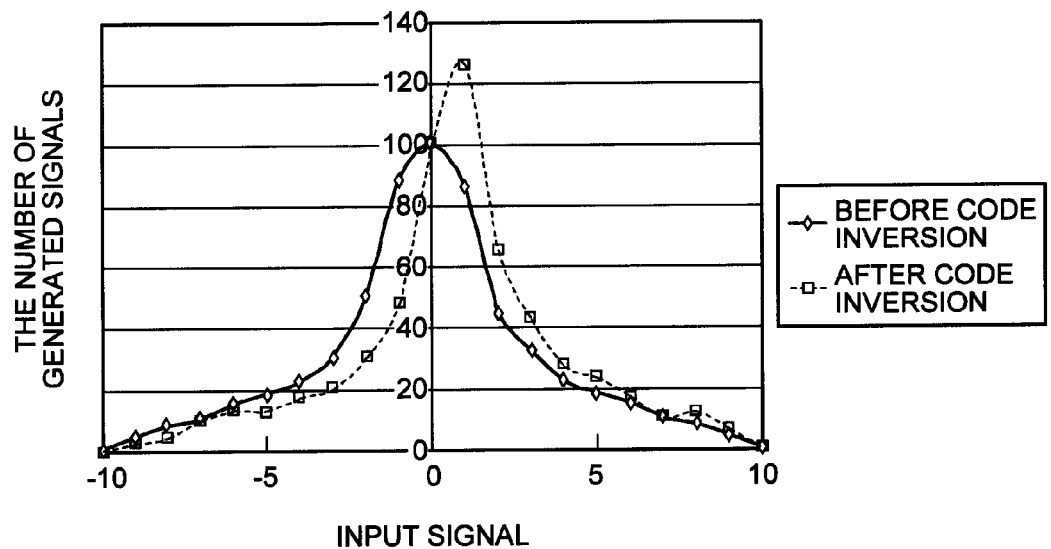
FIG. 14 is a diagram showing a signal histogram of before and after code inversion.

FIG. 14 is a diagram explaining a signal histogram of before and after the code inversion. In FIG. 14, by inverting the codes, the distribution of the input signals is shifted. More specifically, by using a property in which positive signals and negative signals appear nearly evenly, and inverting codes when there are locally many positive signals or many negative signals, the distribution of the input signals is shifted. In this way, when using a variable length code table in which code lengths are asymmetric in positive and negative values, entropy can be reduced. The variable length encoding unit 53 variable length encodes the input signals and transmits the encoded signals to the compression mode determining unit 106.

The compression mode determining unit 106 determines a compression mode with which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and a value smaller than or equal to the average amount of code allocated to a block.

The compression mode determining unit 106 selects a compression mode for each unit of processing so that the amount of code does not exceed the upper limit line of the amount of code. The compression mode determining unit 106 selects a compression mode from the variable length compression modes, for which the amounts of code generated by the temporary compression unit 105 being evaluated, and the fixed length compression mode. The compression mode determining unit 106 selects a compression mode by using, for example, the method described in the first embodiment.

The function and the configuration of the primary compression unit 107 are the same as those in the first embodiment.

With the above-described processing, the input image 102 can be compressed into the compressed data 110 having a predetermined data size. In this method, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Sixth Embodiment

FIG. 3 is a diagram explaining a functional configuration of the moving image encoding apparatus 103 according to a sixth embodiment. The input image 102 is input to the moving image encoding apparatus 103. The moving image encoding apparatus 103 performs compression processing after determining compression mode on the basis of the amount of code of the fixed length compression mode 101, and outputs the compressed data 110. The moving image encoding apparatus 103 includes the image block buffer 104, the temporary compression unit 105, the compression mode determining unit 106, and the primary compression unit 107.

The input image 102 includes a plurality of component signals. The plural component signals are, for example, RGB and YUV. In this embodiment, the input image 102 is divided into blocks and stored in the image block buffer 104 for each component. A target amount of code is set for the input image 102. The blocks of the image stored in the image block buffer 104 is temporarily compressed by the temporary compression unit 105 using a plurality of different QPs for each component, so that plural amounts of code corresponding to the QP are obtained.

FIG. 4 is a diagram explaining a functional configuration of the temporary compression unit 105. The temporary compression unit 105 includes the entropy reduction processing unit 51, the quantization unit 52, and the variable length encoding unit 53. The entropy reduction processing unit 51 performs differential processing of an estimated pixel value or a linear transform such as DCT on the blocks stored in the image block buffer 104.

Here, a limited range is provided for pixel values of the input image. Generally, the bit length of a difference value between an estimated pixel value and an input pixel is the number of bits of the input pixel +1. For example, a value of an input pixel of 8 bits can be 0 to 255, and a value of a differential signal can be −255 to 255, which is a value of 9 bits including a sign bit.

Therefore, if pixel values of the input image are limited in a range which is determined by the quantization width in advance, the bit length of the difference values can be the same as the bit length of the input pixels as a value without a sign bit. When restoring an input pixel, the difference value including a quantization error is added to the estimated pixel value, and then, the carry bit is discarded. The limited range of the pixel values is determined so that, when the input image is quantized, inverse-quantized, and restored, errors are within the quantization width.

For example, when performing lossless compression, if the pixel value is 0 and the estimated value is 255, the difference value is handled as +1 instead of −255. When restoring the pixel, the difference value of +1 is added to the estimated value of 255, so that 256 is obtained. Since 256 is 100000000 in binary, when discarding the carry bit and extracting the least significant 8 bits, the original pixel 0 can be restored.

On the other hand, when performing lossy compression, if the pixel value is 0 and the estimated value is 255, an example is considered in which the differential signal is quantized by the quantization width 3. When there is no limited range of the pixel values, the differential signal is +1, and when quantizing the differential signal by the quantization width 3, the result is ⅓=0 (rounded off). The difference value obtained by inverse-quantizing the quantized differential signal is also 3×0=0, so that the original pixel value 0 cannot be restored from the estimated value 255 and the difference value 0. Therefore, the pixel values are limited to a range of 2 to 253. The pixel value 0 is handled as 2 due to the value limitation. The estimated value is 255 and the differential signal is +3. When quantizing the differential signal by the quantization width 3, the result is ⅔=1 (rounded off). When inverse-quantizing this value, the differential signal +3 is obtained. When adding the differential signal +3 to the estimated value 255, 258 is obtained. Since 258 is 100000010 in binary, when discarding the carry bit and extracting the least significant 8 bits, the input pixel can be restored as 2 (error is 2).

By the above series of processing, there are effects that the number of symbols used for encoding can be reduced, the compression performance increases, and a circuit scale is reduced. In addition, this processing can be realized in high throughput. Therefore, this processing may be applied.

The quantization unit 52 quantizes a block output from the entropy reduction processing unit 51 or blocks stored in the image block buffer. The variable length encoding unit 53 variable length encodes a quantized block.

In this embodiment, the function and the configuration of the variable length encoding unit 53 are the same as those in the third embodiment, so that the description thereof will be omitted.

The amount of code to be generated is obtained by the above processing and transmitted to the compression mode determining unit 106.

The compression mode determining unit 106 determines a compression mode with which the primary compression unit 107 performs compression. The amount of code of the fixed length compression mode 101 is set in the compression mode determining unit 106. The amount of code of the fixed length compression mode 101 is a value smaller than or equal to the amount of code when code is equally allocated to the blocks, and is a value smaller than or equal to the average amount of code allocated to a block. The compression mode determining unit 106 selects a compression mode by using, for example, the method described in the first embodiment.

The compression mode determining unit 106 selects a compression mode for each unit of processing so that the amount of code does not exceed the upper limit line of the amount of code. The compression mode determining unit 106 selects a compression mode from variable length compression modes, for which the amounts of code generated by the temporary compression unit 105 being evaluated, and the fixed length compression mode.

The details of the processing of the compression mode determining unit 106 are the same as those in the first embodiment, so that the description thereof will be omitted. The functions and the configurations of the fixed length compression unit 108 and the variable length compression unit 109 included in the primary compression unit 107 are the same as those in the first embodiment.

The compressed data 110 includes a first QP, a QP offset, idx, information related to estimation, and symbol values corresponding to each pixel. The first QP corresponds to a component signal among a plurality of components. The QP offset is a difference between QP of another component signal and the first QP, and QP of another component is calculated by adding the QP offset to the first QP. The idx is information for identifying the method of variable length encoding of each component signal. The information related to estimation is information related to estimation of each component signal, and includes information such as an estimated direction and an estimated value calculation formula.

One symbol value includes a plurality of component signals. One symbol value includes a plurality continuous prefixes and a plurality of continuous suffixes. A second symbol value, which is obtained from a prefix in the plurality of continuous prefixes and a suffix in the plurality of continuous suffixes, is a signal of one component. As an example of the second symbol value, there are a unary code whose prefix has a variable length and a Golomb-Rice code whose suffix length is determined by the idx and the length of the prefix.

Hereinafter, two examples of a data structure of compressed data when compressing an image of YUV444 format are shown. YUV444_compression_data is an example in which color differences U and V respectively have a QP offset with respect to luminance Y.

```
YUV444_compression_data
{
• QP_Y              (QP of Y)
• QP_offsetU        (QP of U = QP_Y+QP_offsetU)
• QP_offsetV        (QP of V = QP_Y+QP_offsetV)
• VLC_idxY          (idx of variable length encoding of Y)
• VLC_idxU          (idx of variable length encoding of U)
• VLC_idxV          (idx of variable length encoding of V)
• symbol_YUV444_1   (First element of YUV compression symbol)
• symbol_YUV444_2   (Second element of YUV compression symbol)
    ...
• symbol_YUV444_i   (ith element of YUV compression symbol)
    ...
• symbol_YUV444_n   (nth element of YUV compression symbol)
}
symbol_YUV444_i     (ith element of YUV compression symbol)
{
• prefixY   (Prefix of symbol including Y)
• prefixU   (Prefix of symbol including U)
• prefixV   (Prefix of symbol including V)
• suffixY   (Suffix of symbol including Y)
• suffixU   (Suffix of symbol including U)
• suffixV   (Suffix of symbol including V)
}
```

An example of symbol_YUV444_i will be described below. For example, the prefix is a unary code of variable length, and the suffix is determined by the length of the prefix and the idx of the variable length encoding. In the example below, the suffix length of Y is 4, the suffix length of U is 5, and the suffix length of V is 3.

Although prefix and suffix of each of Y, U, and V are shown here, these codes continue in a symbol.
 prefixY 000001
 prefixU 00001
 prefixV 01
 suffixY 1010
 suffixU 11111
 suffixV 101
In this case, the symbols of Y, U, and V are as follows:
 Symbol of Y 000001|1010
 Symbol of U 00001|11111
 Symbol of V 01|101

YUV444_compression_data2 is an example in which information related to estimation is included and the color differences U and V have a common QP offset with respect to luminance Y.

```
YUV444_compression_data2
{
• predMode_Luma       (Information related to estimation of Y)
• predMode_Chroma     (Information related to estimation of U
and V)
• QP_Luma             (QP of Y)
• QP_offsetChroma     (QP of U and V = QP_Y+QP_offsetChroma)
• VLC_idxLuma         (idx of variable length encoding of Y)
• VLC_idxChroma       (idx of variable length encoding of U and
V)
• symbol_YUV444_1     (First element of YUV compression symbol)
• symbol_YUV444_2     (Second element of YUV compression symbol)
    ...
• symbol_YUV444_i     (ith element of YUV compression symbol)
    ...
• symbol_YUV444_n     (nth element of YUV compression symbol)
}
```

Next, an example of a data structure of compressed data when compressing an image of YUV422 format is shown. YUV422_compression_data is an example in which color differences U and V respectively have a QP offset with respect to luminance Y. Compressed data of YUV422 format includes an element of symbol including a combination of luminance Y and color difference U and an element of symbol including a combination of luminance Y and color difference V.

```
YUV422_compression_data
{
• QP_Y             (QP of Y)
• QP_offsetU       (QP of U = QP_Y+QP_offsetU)
• QP_offsetV       (QP of V = QP_Y+QP_offsetV)
• VLC_idxY         (idx of variable length encoding of Y)
• VLC_idxU         (idx of variable length encoding of U)
• VLC_idxV         (idx of variable length encoding of V)
• symbol_YU_1      (First element of YU compression symbol)
• symbol_YV_1      (First element of YV compression symbol)
    ...
• symbol_YU_i      (ith element of YU compression symbol)
• symbol_YV_i      (ith element of YV compression symbol)
    ...
• symbol_YU_n      (nth element of YU compression symbol)
• symbol_YV_n      (nth element of YV compression symbol)
}
symbolYU_i{
• prefixY   (Prefix of symbol including Y)
• prefixU   (Prefix of symbol including U)
• suffixY   (Suffix of symbol including Y)
• suffixU   (Suffix of symbol including U)
}
symbolYV_i{
• prefixY   (Prefix of symbol including Y)
• prefixV   (Prefix of symbol including V)
• suffixY   (Suffix of symbol including Y)
• suffixV   (Suffix of symbol including V)
}
```

An example of symbolYU_i will be described below. For example, the prefix is a unary code of variable length, and the suffix is determined by the length of the prefix and the idx of the variable length encoding. In the example below, the suffix length of Y is 2 and the suffix length of U is 3.

Although prefix and suffix are shown here, these codes continue in a symbol.
prefixY 0001
prefixU 001
suffixY 11
suffixU 101

In this case, the symbols of Y and U are as follows:
Symbol of Y 0001|11
Symbol of U 001|101

An example of symbolYV_i will be described below. For example, the prefix is a unary code of variable length, and the suffix is determined by the length of the prefix and the idx of the variable length encoding. In the example below, the suffix length of Y is 2 and the suffix length of V is 5.

Although prefix and suffix are shown here, these codes continue in a symbol.
prefixY 000001
prefixV 01
suffixY 01
suffixV 10101

In this case, the symbols of Y, U, and V are as follows:
Symbol of Y 000001|01
Symbol of V 01|10101

With the above-described processing, the input image 102 can be compressed into the compressed data 110 having a predetermined data size. In this method, there is a great deal of flexibility in selecting the compression mode in the compression mode determining unit 106, and the amount of code allocated to each block can be variable, so that image quality is nearly constant in the image, and thus it is possible to perform compression with quality higher than that of the CBR control.

Seventh Embodiment

Figure 15:
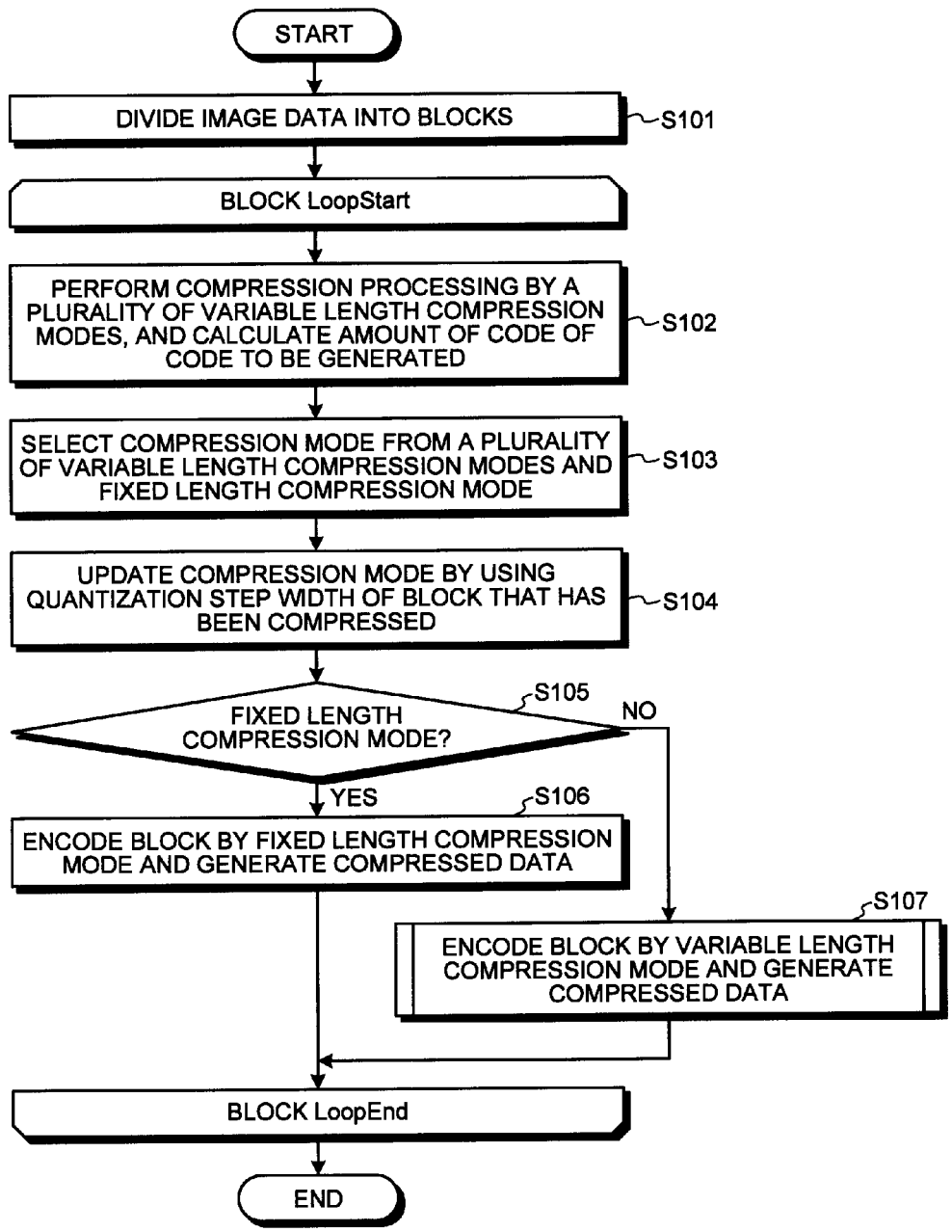
FIG. 15 is a flowchart showing processing for compressing a moving image.

An embodiment may be a combination of one or more embodiments of from the first embodiment to the sixth embodiment. FIG. 15 is a flowchart showing processing in which the moving image encoding apparatus 103 compresses a moving image. In the processing of FIG. 15, input image data is divided into blocks, a compression mode in which the image data is compressed to less than a predetermined amount of code is selected, the image data is compressed, and thereby compressed data is generated.

In step S101 of FIG. 15, a predetermined unit of the input image 102 is divided into blocks and stored in the image block buffer 104. After the processing of step S101, the processing from step S102 to step 107 is repeated for a certain number of times, which corresponds to the number of blocks included in the predetermined unit.

In step S102, the temporary compression unit 105 performs compression processing by a plurality of variable length compression modes and calculates the amount of code of the code to be generated. Here, it is desired that the temporary compression unit 105 performs compression processing using a plurality of QPs different from each other. Or, variable length code tables different from each other may be used with respect to one QP.

In step S103 following step S102, the compression mode determining unit 106 selects a compression mode from a plurality of variable length compression modes in which the amount of code is calculated in step S102 and the fixed length compression mode. More specifically, for example, on the basis of FIG. 7, a compression mode in which the amount of code is smaller than or equal to a predetermined value is selected. The compression mode determining unit 106 selects a compression mode by using, for example, the method described in the first embodiment.

Further, the compression mode determining unit 106 stores information of the compression mode in the compression mode buffer 62. This information is related to compression rate, such as, for example, a quantization parameter including QP, the amount of code of a block, or a compression rate. For example, the QP may be a quantization step width.

The process proceeds from step S103 to step S104. In step S104, by using information related to a compression rate of a block that has been compressed, the compression mode is updated. For example, this processing corresponds to the processing shown in FIG. 11 in which QPave of the block line immediately above the current block line is used.

The process proceeds from step S104 to step S105, and it is determined whether or not the compression mode selected in step S104 is the fixed length compression mode. If the compression mode is the fixed length compression mode, the process proceeds to step S106, and if the compression mode is not the fixed length compression mode, the process proceeds to step S107.

In step S106 following step S105, the fixed length compression unit 108 encodes each block by the fixed length compression mode and generates compressed data. On the other hand, in step S107 following step S105, the variable length compression unit 109 encodes each block by the variable length compression mode and generates compressed data. After the processing of step S106 or step S107, if there is a block that has not yet been processed, the process returns to step S102 and repeat the processing. On the other hand, if all the blocks have been processed, the process ends.

FIG. 16 is a flowchart explaining the details of the processing by the variable length compression unit 109 in step S107 in FIG. 15. In step S201, the entropy reduction processing is performed. The entropy reduction processing is estimation processing such as difference calculation between pixels, a linear transform by DCT, or the like. The process proceeds from step S201 to step S202, and quantization processing is performed on a value obtained by the entropy reduction processing in step S201. The quantization processing may be performed on a value on which the entropy reduction processing has not yet been performed.

The process proceeds from step S202 to step S203, and it is determined whether or not the input signal string is shifted to the positive side or the negative side with respect to the variable length code that has already been generated. If the input signal string is shifted to the positive side or the negative side, the process proceeds to step S204, and if the input signal string is not shifted, the process proceeds to step S205. The process proceeds from step S203 to step S204, and the positive/negative of a symbol that will be variable length encoded is inverted. The process proceeds from step S204 to step S205.

In step S205, variable length codes respectively corresponding to a plurality of different variable length code tables are generated. The process proceeds from step S205 to step S206, and a variable length code having the smallest amount of code among the variable length codes generated in step S205 is selected and output. The processing from step S203 to step S205 may be performed in step S102 in FIG. 15.

Implementation by Computer or the Like

The moving image encoding apparatus according to the embodiments can be implemented as, for example, an ASIC circuit. The moving image encoding apparatus according to the embodiments may also be implemented by a personal computer (PC) or the like. The moving image encoding method according to the embodiments is executed, for example, by CPU in accordance with a program stored in a ROM, a hard disk, or the like by using a main memory such as a RAM as a work area.

According to embodiments, when compressing moving image data and generating code data, it is possible to generate code data whose amount of code is smaller than a predetermined value and which realizes a good quality of decoded image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A moving image encoding apparatus comprising:
circuitry configured to calculate, for each of plural units of processing, amounts of code using a plurality of variable length compression modes, the units of processing being obtained by dividing a predetermined unit of image data, the plurality of variable length compression modes having compression rates different from each other;
select, for each of the units of processing, a compression mode in which an accumulated amount of code is smaller than or equal to a predetermined amount of code and in which a quantization width is minimum, the compression mode being selected from the variable length compression modes and a fixed length compression mode on the basis of the amounts of code calculated for the variable length compression modes and an amount of code obtained when the image data is compressed by the fixed length compression mode, and the accumulated amount of code being obtained by calculating, among the units of processing included in the predetermined unit, until a unit of processing in which the compression mode is selected; and
compress the unit of processing of image data by the compression mode selected to generate compressed data,
wherein the unit of processing is one of rectangles formed by dividing the image data into rectangles and arranging the rectangles in raster order, and
the circuitry updates a compression mode selected for one of the rectangles by using information related to a compression rate of the compression mode selected for a rectangle that has already been compressed,
wherein when the image data includes a plurality of component signals, the circuitry calculates the amount of code for each compression mode for each component signal of the unit of processing, and the circuitry selects a compression mode on the basis of the sum of the amount of code corresponding to a component signal for each unit of processing,
wherein the circuitry performs compression including quantization and variable length encoding, and causes the compressed data to include a quantization parameter that is information related to a quantization width corresponding to one of the component signals, a quantization parameter offset that is information related to a difference between the quantization width and a quantization width of another component signal, identification information of a variable length code table for each component signal, and a symbol value including variable length codes of a plurality of component signals, and
wherein when a variable length code of a component signal of a pixel is represented by a combination of a prefix and a suffix, the circuitry causes the symbol value to include a code string in which prefixes of a plurality of component signals continue and a code string in which suffixes of a plurality of component signals continue.

2. The apparatus according to claim 1, wherein the circuitry is configured to perform variable length compression and fixed length compression, and when performing variable length compression, the circuitry inverts positive/negative of a symbol value that is newly variable length encoded when a symbol value before variable length encoding, which corresponds to a variable length code already generated, is shifted to a positive side or a negative side.

3. The apparatus according to claim 2, wherein when performing variable length compression, the circuitry performs a plurality of variable length encodings which generate variable length codes different from each other and outputs a variable length code having a smallest amount of code among the variable length codes generated.

4. The apparatus according to claim 1, wherein the circuitry generates compressed data by quantizing a differential signal of pixel values, and the circuitry limits a range of pixel values of the image data so that errors generated when inverse-quantizing and decoding the compressed data are within a quantization width.

5. The apparatus according to claim 1, wherein the circuitry further performs estimation for each component signal, and further causes the compressed data to include information related to the estimation for each component signal.

6. A method of encoding moving images, comprising:

calculating, with circuitry and for each of a plurality of units of processing, amounts of code using a plurality of variable length compression modes, the units of processing being obtained by dividing a predetermined unit of image data, the plurality of variable length compression modes having compression rated different from each other;

selecting, with the circuitry and for each of the units of processing, a compression mode in which an accumulated amount of code is smaller than or equal to a predetermined amount of code and in which a quantization width is minimum, the compression mode being selected from the variable length compression modes and a fixed length compression mode on the basis of the amounts of code calculated for the variable length compression modes and an amount of code obtained when the image data is compressed by the fixed length compression mode, and the accumulated amount of code being obtained by calculating, among the units of processing included in the predetermined unit, until a unit of processing in which the compression mode is selected; and compressing, with the circuitry, the units of processing of image data by the compression mode selected to generate compressed data, wherein the unit of processing is one of rectangles formed by dividing the image data into rectangles and arranging the rectangles in raster order, and the circuitry updates a compression mode selected for one of the rectangles by using information related to a compression rate of the compression mode selected for a rectangle that has already been compressed, wherein when the image data includes a plurality of component signals, the amount of code for each compression mode for each component signal of the unit of processing is calculated, and a compression mode on the basis of the sum of the amount of code corresponding to a component signal for each unit of processing is selected, wherein compression is performed including quantization and variable length encoding, and the compressed data is caused to include a quantization parameter that is information related to a quantization width corresponding to one of the component signals, a quantization parameter offset that is information related to a difference between the quantization width and a quantization width of another component signal, identification information of a variable length code table for each component signal, and a symbol value including variable length codes of a plurality of component signals, and wherein when a variable length code of a component signal of a pixel is represented by a combination of a prefix and a suffix, the symbol value is caused to include a code string in which prefixes of a plurality of component signals continue and a code string in which suffixes of a plurality of component signals continue.

7. A moving image encoding apparatus comprising:

circuitry configured to calculate, for each of plural units of processing, amounts of code using a plurality of variable length compression modes, the units of processing being obtained by dividing a predetermined unit of image data, the plurality of variable length compression modes having compression rates different from each other;

select, for each of the units of processing, a compression mode in which an accumulated amount of code is smaller than or equal to a predetermined amount of code and in which a quantization width is minimum, the compression mode being selected from the variable length compression modes and a fixed length compression mode on the basis of the amounts of code calculated for the variable length compression modes and an amount of code obtained when the image data is compressed by the fixed length compression mode, and the accumulated amount of code being obtained by calculating, among the units of processing included in the predetermined unit, until a unit of processing in which the compression mode is selected; and compress the unit of processing of image data by the compression mode selected to generate compressed data, wherein the predetermined amount of code is a value based on an average amount of code per predetermined unit when compressing the predetermined unit for each unit of processing by the fixed length compression mode.

8. The apparatus according to claim 7, wherein the predetermined amount of code is a value smaller than or equal to a difference between a target amount of code set for the predetermined unit and a value obtained by multiplying the number of units of processing, which have not yet been compressed by the circuitry in the predetermined unit, by the average amount of code.

* * * * *